FEEDBACK CIRCUITS FOR STORAGE TUBES

Filed July 2, 1956 4 Sheets-Sheet 1

INVENTOR.
SIEGFRIED HANSEN
BY Nicholas T Volsk
atty

FEEDBACK CIRCUITS FOR STORAGE TUBES

Filed July 2, 1956 4 Sheets-Sheet 2

INVENTOR.
SIEGFRIED HANSEN
BY
Nicholas T Volk
atty

FEEDBACK CIRCUITS FOR STORAGE TUBES

Filed July 2, 1956 4 Sheets-Sheet 3

INVENTOR.
SIEGFRIED HANSEN
BY Nicholas T Volsk
atty

FEEDBACK CIRCUITS FOR STORAGE TUBES

Filed July 2, 1956 4 Sheets-Sheet 4

INVENTOR.
SIEGFRIED HANSEN
BY
Nicholas T Volk
atty

United States Patent Office 2,896,110 Patented July 21, 1959

2,896,110

FEEDBACK CIRCUITS FOR STORAGE TUBES

Siegfried Hansen, Los Angeles, Calif.

Application July 2, 1956, Serial No. 595,354
15 Claims. (Cl. 315—12)

This invention relates to storage tube circuits and, in particular, to feedback circuits therefor which provide for linear operation of the storage tube.

This application is a continuation in part of my application, Serial No. 198,610, filed December 1, 1950, and now abandoned.

The storage tubes contemplated for operational improvement by this invention are those which contain a target electrode and a collector electrode, and whose output signal is derived by a collection of a portion of the secondary emission electrons emitted by the target electrode. The majority of this class of storage tubes has a single electron beam which serves the dual purpose of initially storing an input signal as a charge pattern on the target electrode and later deriving an output signal corresponding to the input signal from the charge pattern. The "graphechon" tube, manufactured by Radio Corporation of America, and described in "The Graphechon—A Picture Storage Tube" by L. Pensak, R.C.A. Review, volume 10, No. 1, pages 59 to 73, March 1949, however, has two such electron beams: one for storing the input signal, and the other for deriving the output signal. The disclosed circuits are applicable to storage tubes in general, but will be illustrated here in connection with the "graphechon" tube since the latter has gained wide use and may thus be considered representative of this class of storage tubes.

One of the types of signals suitable for storage by the "graphechon" tube represents a visual image of the type presented on the screen of any cathode ray tube or kinescope. The single image thus stored may be continuously reproduced in the form of an output signal appearing across the output circuit of the tube. When this output signal is applied to a cathode ray tube, the cathode ray tube will present a continuous picture of the stored image on its screen. The continuous picture, thus presented, may be sustained for an interval of time determined by the storage time of the "graphechon" tube.

The "graphechon" tube has made it possible for an observer to view a sustained image of extremely high speed transients without the usual difficulties incurred by using cathode ray tube screens of long phosphorescence. Also, the "graphechon" tube has been used in the Teleran system for the storage of Plan Position Indicator (P.P.I.) radar signals. Circular sweeps, having very low angular velocity, are generally used in connection with P.P.I. systems, with the result that it is necessary to have a screen of long phosphorescence to retain as large a fraction as possible of the complete circular sweep. In view of this inherent limitation of the cathode ray tube, it has been found advantageous to replace it in P.P.I. systems with a "graphechon" tube and its associated circuits which have made it possible to store the entire circular image on the target electrode of the "graphechon" tube. This image is then scanned by the reading gun of the "graphechon" tube. This scanning produces a signal which, in turn, is used for reproducing the final P.P.I.

visual picture of the entire area scanned by the P.P.I. radar system on the screen of a cathode ray tube. Such an application of the "graphechon" tube has made it possible for an observer to view at a glance the entire P.P.I. image.

The use of the "graphechon" tube for storing and presenting an image as a continuous picture has been limited by the non-linearity of the output signal which is capable only of producing an image of extreme contrast. Similar non-linearity also occurs in other storage tubes of the same general class owing to their similar mode of operation. Thus, these storage tubes, in general, in their prior applications, have been able to reproduce accurately only black or white image values, and have been incapable of reproducing any tonal gradation which might be present in the original image.

The inability to secure any gradations in the output signal corresponding to the stored image is due primarily to the fact that it is necessary to operate the collector electrode at a potential corresponding to complete saturation with respect to secondary emission collection for two major reasons. In the first place, if the collector electrode is operated at a constant potential of a few volts positive with respect to the target, instead of a potential high enough to insure saturation of the collection of secondary emission electrons from all portions of the target surface, the operation will be linear for only those portions of the target surface having relatively low negative charge, and will be non-linear for those portions of the target surface having relatively high negative charge. Thus, the output signal will be partly non-linear and partly linear, according to the particular portion of the target surface from which it is derived.

Another reason for operating the collector electrode at a saturation potential is to secure a reasonable storage time. The relatively low negatively charged portions of the target electrode become discharged sooner than the relatively high negatively charged portions of the target. Thus, a relatively small positive collector electrode potential would allow the slightly negatively charged portions of the target to become completely discharged in a relatively short period of time with the result that a blank portion would be produced in the output signal corresponding thereto. The storage time of the tube may be increased by making the collector voltage more and more positive with respect to the target, since the storage time is directly proportional to the potential difference between the target and collector electrodes. However, such an increase in the collector electrode potential transfers the operating point of the tube to a non-linear region of its voltage-current curve which, in turn, causes distortion in the output signal. Thus, any increase in the storage time characteristic of the tube, obtained by increasing the positive voltage on the collector, is done so at the expense of linear operation.

The present invention discloses negative feedback circuits which constantly maintain a proper potential difference between the collector and target electrodes, irrespective of the amplitude of the target voltage, so that the tube is operated continuously on the linear portion of its voltage-current curve. This results in a linear response to stored signals of variable amplitude and a substantially constant storage time for all stored signals, regardless of amplitude.

It is, therefore, an object of the present invention to provide negative feedback circuits for storage tube circuits, each of the feedback circuits producing a linear operation of the storage tube.

It is also an object of the present invention to provide circuits for a storage tube by which the tube will be capable of electronically transforming one group of electrical signals, representing one visual image, in a second group of electrical signals, representing the same visual image, in which a linear relationship of amplitude exists between the two sets of signals; the visual image represented by the second group of signals being of comparable contrast to the original visual image.

It is a further object of the present invention to provide feedback circuits for a storage tube whereby the collector electrode of the tube is maintained slightly positive at all times with respect to the target electrode, and the potential difference existing therebetween has a substantially constant value regardless of the target potential whereby the output signal is a faithful reproduction of the input signal.

Still another object of the present invention is to provide a resistive path between the collector electrode of a storage tube and ground whereby degenerative feedback of the collector potential caused by electron current flow to ground of the secondary emission electrons collected by the collector electrode provides a more linear tube response.

An additional object of the present invention is to provide a feedback path from the final output terminal of a storage tube circuit, the output signal appearing thereon being originally derived from the target electrode, to the target electrode whereby the final output signal of the storage tube is linear with respect to the stored input signal.

Another object of this invention is to provide a feedback path from the final output terminal of a storage tube circuit, the output signal appearing thereon being originally derived from the collector electrode, to the collector electrode, thereby providing for a more linear final output signal from the storage tube circuit.

The novel features which I believe to be characteristic of the invention, both as to its organization and method of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only, and are not intended as a definition of the limits of the invention.

Figure 6:
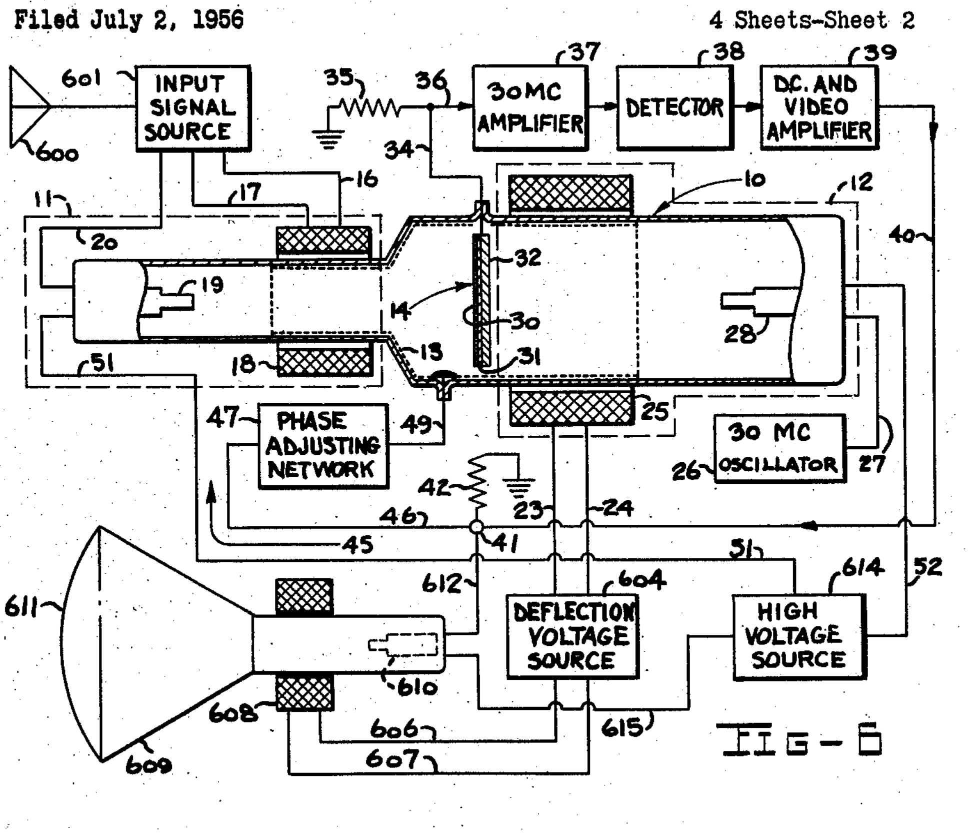
Figure 7:
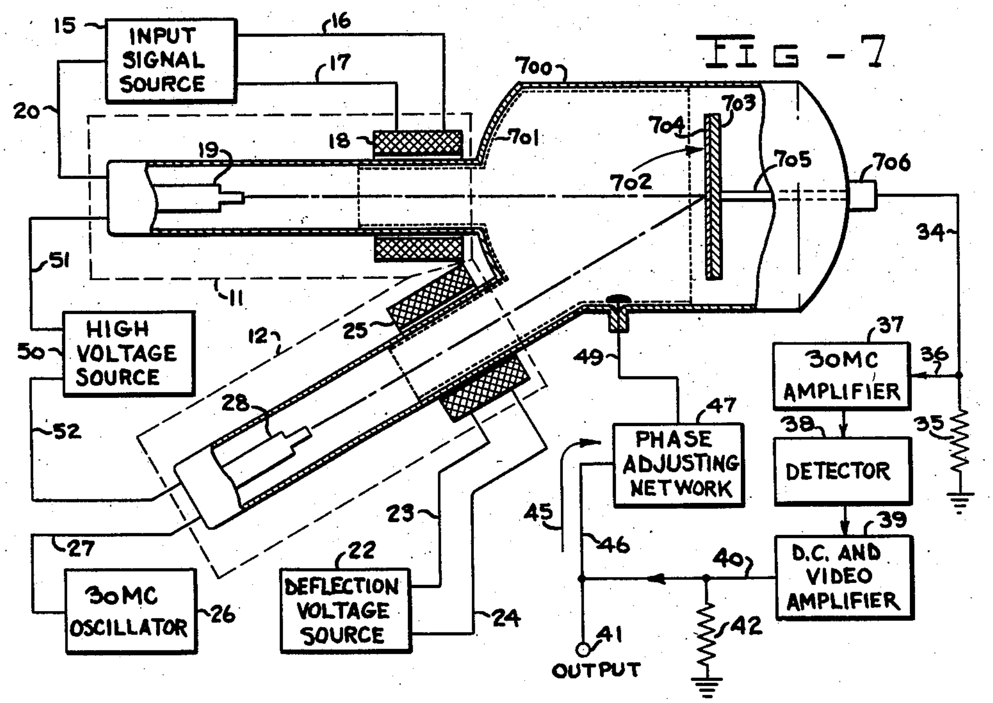
Figure 8:
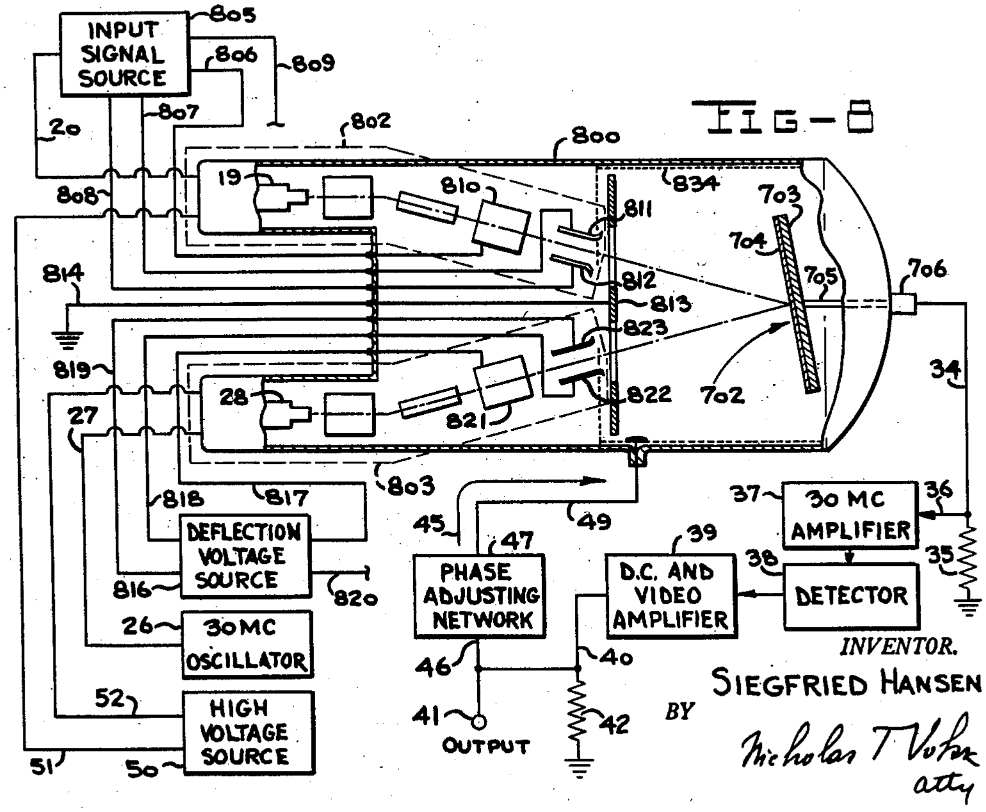

Figs. 5*a* through 5*c* are schematic representations of secondary emission collection in the "graphechon" tube;

Fig. 6 is a block diagram showing one use of the "graphechon" tube circuit according to the present invention;

Figs. 7 and 8 are block-schematic diagrams of other types of "graphechon" tubes and their associated circuits including the present invention; and Figs. 9 through 13 are circuit diagrams of additional embodiments of the present invention.

Figure 1:
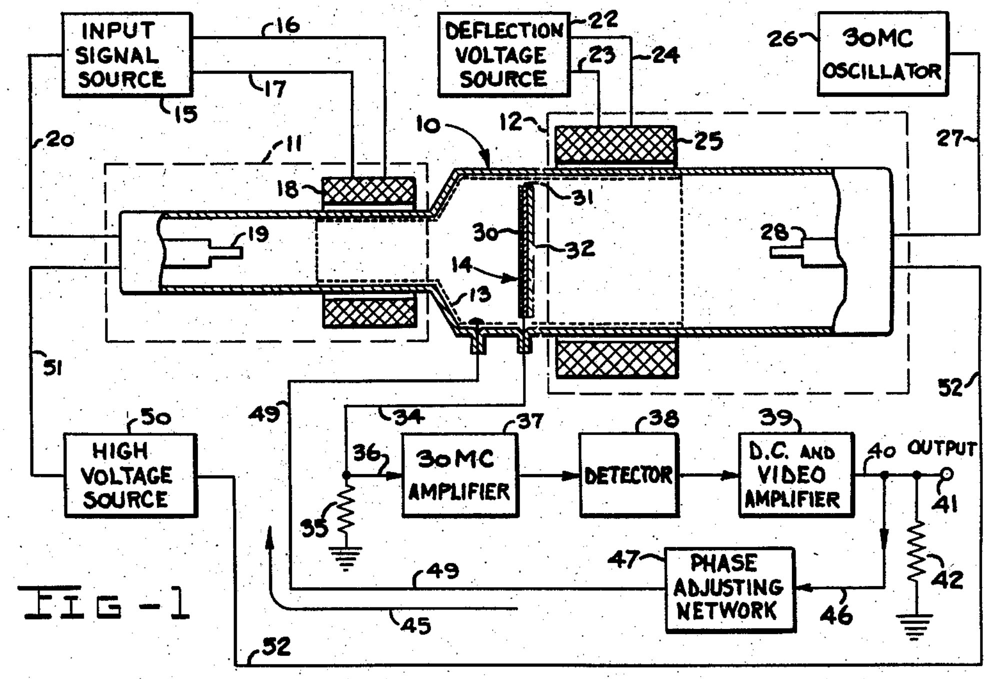
Fig. 1 is a block-schematic diagram of one type of "graphechon" tube and its associated circuit including the present invention.

Fig. 1 discloses a "graphechon" tube and the circuitry associated therewith including the elements characterizing one embodiment of this invention. The "graphechon" tube includes a glass envelope 10, writing gun 11, reading gun 12, collector electrode 13, and target electrode 14. Writing gun 11 and reading gun 12 opposite each other and lie along the same axis.

Writing gun 11 consists of a magnetic deflection coil 18, connected to input signal source 15 by conductors 16, 17, and an electron gun 19 connected to the input signal source 15 by conductor 20. The input signal source 15 supplies two signals, a deflection signal, impressed on coil 18, for deflecting the writing beam emitted by electron gun 19, and a second signal for intensity modulating the writing beam. The second signal, which may be called the intensity modulation signal, is impressed through conductor 20 on the intensity grid in the gun.

Target electrode 14 consists of a fine wire screen 30, a thin plate of aluminum 31, and a thin layer of dielectric material 32 deposited on aluminum plate 31. Screen 30 is utilized primarily as a structural support for aluminum plate 31 and dielectric layer 32, and is designed to have high transmission properties and to be fine enough so as not to affect the resolving power of the tube. For reasons outlined later in this specification, aluminum plate 31 must be thin enough to be effectively transparent to the writing beam.

Reading gun 12 includes a magnetic deflection coil 25 connected to deflection voltage source 22 by conductors 23 and 24, and an electron gun 28 connected to a 30 megacycle oscillator 26 by conductor 27. The electron beam emitted by electron gun 28 is intensity modulated by 30 megacycle oscillator 26, and is deflected in response to the signal supplied by deflection voltage source 22 to coil 25. A high voltage source 50 supplies a first high potential to electron gun 19 through a conductor 51, and a second high potential to electron gun 28 through a conductor 52.

Aluminum plate 31 of target electrode 14 is connected through a resistor 35 to ground. The signal appearing across resistor 35 is applied by conductor 36 as an input signal to 30 megacycle amplifier 37, the output signal of which, in turn, is fed into detector 38. The output signal of detector 38 is applied as an input signal to a direct current and video amplifier 39. The final output signal of the "graphechon" tube circuit appears on terminal 41, which is the output signal of amplifier 39.

Collector electrode 13 comprises a conductive coating placed on the inner surface of glass envelope 10. The feature characterising the particular embodiment of the invention as shown in Fig. 1 is negative feedback loop 45, connecting output terminal 41 to collector electrode 13, and comprising serially connected conductor 46, phase adjusting network 47, and conductor 49. Resistor 42 is connected between output terminal 41 and ground, and serves as a conduction path to ground for the secondary emission electrons collected by collector electrode 13, and is also a portion of the load of amplifier 39.

In order to understand the theory of operation of the "graphechon" tube and associated circuit according to the present invention, it is first necessary to consider the theory of operation of a conventional "graphechon" tube circuit without the presence of the feedback loop 45. The intensity variations of the signal from input signal source 15, appearing on conductor 20, which are to be stored and later presented as a continuous picture on a kinescope or television tube screen, are used to modulate the writing beam current emanating from electron gun 19. This writing beam current is maintained at a substantially constant potential, high enough to penetrate not only aluminum plate 31, but also dielectric layer 32. The writing beam must have a voltage of substantially 10,000 volts to accomplish both penetrations. The effect of the current of this writing beam in penetrating the dielectric layer 32 is to negatively charge each increment thereof, the negative value of any instantaneous charge being proportional to the instantaneous current in the beam.

The surface of the dielectric layer 32 exposed to the reading beam may be considered as consisting of a multitude of two-dimensional incremental condenser plates, each plate being electrically distinct from each adjoining plate, due to the non-transverse conduction property of the dielectric material. The remaining dielectric material, making up the body of the dielectric layer between its surface and plate 31, upon which it is deposited, may be considered as a dielectric element of a condenser, while aluminum plate 31 may be considered as a continuous condenser plate electrostatically common to the multitude of the incremental condenser plates making up the surface of dielectric layer 32. The writing beam thus negatively charges the incremental condensers so described in a prearranged pattern, the pattern depending on the deflection voltages applied to deflecting coil 18. The charge value on each incremental condenser unit is determined by the instantaneous modulated writing beam current.

The reading beam derives the output signal of the tube from dielectric layer 32. The operation of the reading gun is similar in principle to that of an iconoscope tube with respect to the derivation of the output signal by the reading beam from dielectric layer 32. The reading beam is swept over the surface of dielectric layer 32 at a sweep frequency determined by the deflection signal applied to coil 25 by deflection voltage source 22, and in contacting each incremental condenser element, removes a portion of the negative charge thereof. The fact that only a portion of the charge is removed from each condenser element by each scan, allows the entire pattern to be scanned repeatedly before the electrical image thereon disappears due to the complete removal of its individual charges. This feature explains in part how the "graphechon" tube acts as a storage device.

The slight removal of the negative charge on each condenser unit, by each scan of the reading beam, produces an output signal. Any change of a negative charge on any incremental condenser element, making up the surface of dielectric layer 32, produces, by condenser action, an electrostatic change of charge of like magnitude on plate 31. As plate 31 is tied to ground through resistor 35, any change of charge on plate 31 appears as a potential drop across this resistor in the form of an output signal.

Figure 2:
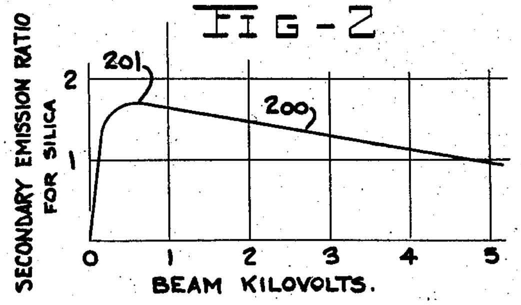
Figs. 2 through 4 are characteristic curves of "graphechon" tube quantities.

Fig. 2 discloses a curve of the secondary emission ratio for silca plotted against the voltage in kilovolts of the reading beam striking its surface. Silica is a typical example of the material which may be used for dielectric layer 32. Each incremental condenser, upon being struck by the reading beam, emits secondary emission electrons, the quantity of which is a function of the material, the reading beam voltage, and the reading beam current. For silica, the number of secondary emission electrons thus liberated may be determined from Fig. 2 by multiplying the number of beam current electrons striking it by the secondary emission ratio at the particular voltage of the reading beam.

The reading beam voltage is not considered critical, but should be sufficient to cause an approximate maximum secondary emission ratio for the particular type of target dielectric material. A beam voltage of approximately 1000 volts will produce, as shown in Fig. 2, a secondary emission ratio of approximately 1.6. This signifies that each ten primary electrons in the reading beam of 1000 volt potential will, upon striking the target surface, liberate 1.6 times that number, or sixteen secondary electrons from the surface of the target.

The secondary emission electrons, upon being liberated by the reading beam, from the surface of an incremental condenser unit on the surface of dielectric film 32, have three possible paths of travel. They may be drawn to collector electrode 13; they may return to the same incremental condenser unit; or they may be drawn to other incremental condenser units. The effects of the latter case are of slight significance in understanding the operation of the tube, and will not be elaborated upon other than to mention that slight distortion of the output signal and reduced efficiency of operation are its main results.

Figure 3:
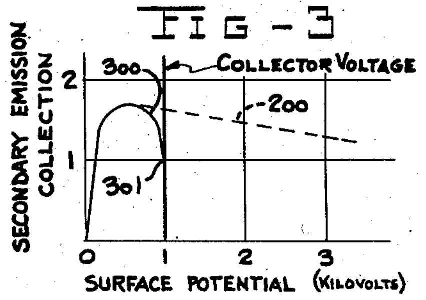

The proportion between the number of secondary emission electrons going to the collector electrode, and the number returning to the incremental condenser unit surface from which the secondary emission electrons were liberated, is a function of the potential difference existing between the collector electrode and the condenser unit surface. The ordinate of Fig. 3 is plotted on the same scale as the ordinate of Fig. 2, and illustrates that the secondary emission collection by collector electrode 13 is unity when the dielectric surface potential is equal to the collector electrode potential. This signifies that, under this operating condition, the secondary emission collection is equal to the beam current; hence, the number of electrons entering each condenser unit is equal to the number leaving it. This is a condition of no net change of condenser charge, and hence, no output signal. Curve 200 of the secondary emission ratio of Fig. 2 is replotted as dotted line 200 in Fig. 3 to illustrate that as the dielectric surface potential becomes more negative with respect to the collector potential, the secondary emission collection shown by curve 300 approaches curve 200 in magnitude. This is a condition of saturation to be discussed later.

Figures 4, 5:
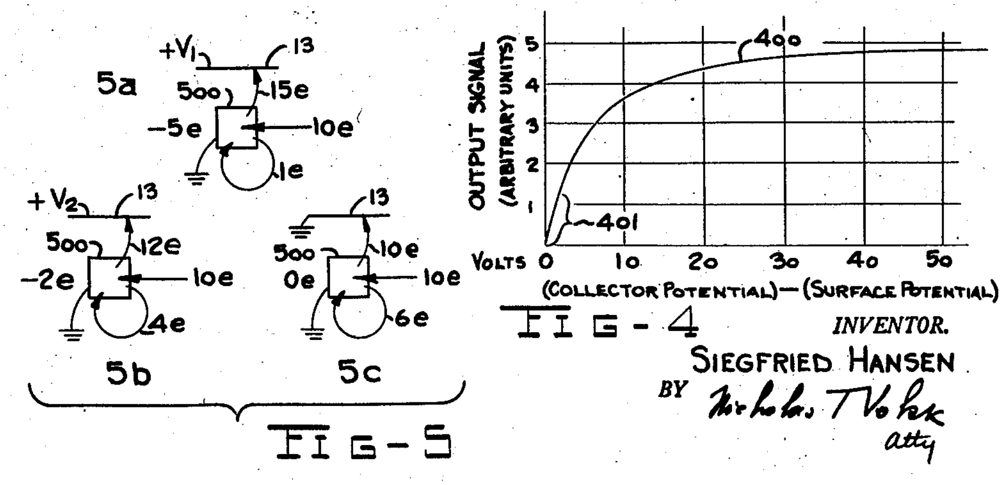

Fig. 4 illustrates a curve 400 of the output signal of the target electrode in arbitrary units plotted against the difference of potential existing between collector electrode 13 and the surface of dielectric layer 30. The operating condition of a zero potential difference between the surface and collector, discussed above, is indicated at the intersection of the two axes at which point a zero signal output is indicated. As the collector potential rises with respect to the target electrode surface potential, the output signal is reasonably linear up to approximately a ten-volt difference, as is designated 401, and then rapidly approaches a saturation condition where the output signal remains almost constant with further increases of potential difference between the collector and target electrodes.

A more precise understanding of the interdependence between the secondary emission collection, the output signal, and the potential difference between the target electrode surface and the collector electrode may be obtained by reference to the examples illustrated in Figs. 5*a* through 5*c.* These figures disclose a segment of the collector electrode 13 as well as a square 500 representing an incremental condenser unit. The reading beam potential is considered constant for these three examples, and has a proper value sufficient to produce a secondary emission ratio of 1.6.

Fig. 5*a* illustrates, by way of example, the result of placing collector electrode 13 at a potential $V_1$ considerably higher than the surface potential of condenser unit 500. Ten electrons, **10*e*, are shown striking the unit, the ten electrons being a segment of the reading beam current. Of the sixteen secondary emission electrons liberated thereby, fifteen electrons, generally designated 15*e*, are shown being drawn to the collector electrode 13, while the single remaining secondary emission electron, generally designated 1*e*, is shown returning to condenser unit 500. The numerical difference between the fifteen electrons collected by the collector electrode 13, and the ten electrons in the primary beam is five electrons, generally designated by —5*e*, and represents the net change of the number of electrons on the condenser unit 500; the minus sign indicating a net loss. It is this net change of charge that produces the output signal through the condenser action between dielectric layer 32 and metal plate 31 of target electrode 14.**

In Fig. 5*b* the collector potential $V_2$ is lower than the previous example of $V_1$ in Fig. 5*a,* but is still positive with respect to the condenser unit surface 500. In this example, twelve secondary emission electrons, generally designated **12*e*, are shown being collected by collector electrode 13 with the remaining four secondary emission electrons, generally designated 4*e*, being returned to the condenser unit. Thus, a net change of charge on the condenser unit is twelve minus ten, or two electrons as designated by —2*e*,** which results in an output signal of less magnitude than the example illustrated in Fig. 5*a.*

A third example is illustrated in Fig. 5*c* which shows the effect of the collector electrode potential being equal to the condenser unit surface potential. In this particular case, as has already been mentioned, the number of secondary emission electrons collected by collector electrode 13 is equal to the number of primary beam electrons, thus leaving no net change of charge on the target electrode, and hence, no output signal.

Fig. 4 is a plot of the conditions shown in the examples of Figs. *5a* through *5c*, except that the output signal, instead of the net change of charge, is shown. Inasmuch as the output signal is produced directly by the instantaneous net change of charge, the curves are equivalent.

The condition shown in Fig. *5a* represents a nearly saturated collection of secondary emission electrons inasmuch as a further increase of collector electrode potential with respect to the target electrode potential will not produce a correspondingly greater collection of secondary emission electrons. Once a collection by the collector electrode of all available secondary emission electrons occurs, further increases of collector electrode potential with respect to the target electrode potential obviously cannot produce a proportionately greater collection.

To secure an output signal from the "graphechon" tube whose magnitude is linear with respect to the input signal, the output signal from each condenser unit must be proportional to the charge thereon. To have the output signal and condenser unit charge thus related, it is necessary to have the removal of charge from each condenser unit proportional to the remaining charge thereon because of the inherent proportionality between the output signal and the removal of charge. The relationship of the removal of charge and the secondary emission collection is obvious from Figs. *5a* through *5c*, and for linear operation of the tube, it is necessary to have the secondary emission collection proportional at all times to the charge on each condenser unit. For this proportional relationship to exist, it is necessary that the collector electrode be operated at a relatively low positive potential at all times with respect to each condenser unit of the target surface. This may be seen by reference to the linear portion of the curve shown in Fig. 4.

In prior uses of the "graphechon tube," it has been necessary to operate the collector electrode potential sufficiently high with respect to the target electrode surface to insure saturation, as for example, 50 volts positive. If the collector electrode were operated at a relatively low constant potential, for example, five volts more positive than the target electrode potential, serious complications in the mode of operation would result. In the first place, saturated collection of secondary emission electrons by the collector electrode would occur for the portions of the target electrode charged to a relatively high negative potential by the writing gun, whereas linear collection would occur for the portions of the target having a relatively low negative charge. Thus, some portions of the output signal would be linear with respect to the target pattern, while other portions would be nonlinear with respect to the target pattern.

Another complication arising by operating the collector electrode at a constant potential of five volts positive with respect to the target electrode lies in the fact that the areas of the target having different charges thereon would have different storage times. Those areas of the target having a relatively high negative charge would become discharged later than those portions of the target having a relatively low negative charge. Hence, the storage time for some portions of the target electrode surface would be considerably less than the storage time for other portions of the target electrode surface. Under this operating condition, the relatively low negatively charged portions of the target electrode would be completely blanked in a short period of time, whereas the portions of the target electrode having a relatively high negative charge would continue yielding clear output signals for a greater length of time. If the collector electrode were operated at a much higher potential, i.e., well within the saturated collection portion of the curve 400 of Fig. 4, the less negatively charged portions of the target surface, although still the limiting factor of the tube concerning storage time, would continue to give an output signal for a much longer period of time than they would in the example just given due to the greater initial potential difference between them and the collector electrode.

Continuing now with the description of the operation of the circuit of Fig. 1, the current modulation of the writing beam in accordance with the signal from input signal source 15 to be stored produces an undesired output signal having an identical modulation across resistor 35. This undesired signal is produced by current conduction to ground through resistor 35 of the writing beam electrons which failed to completely penetrate metal plate 31 of the target and were consequently absorbed by it.

Thus, the output signal appearing across resistor 35 consists of this undesired signal having a modulation similar to the writing signal, as well as the desired output signal produced by the reading beam. This condition exists only when the input signal is of a modulated variety, i.e., television input signal or certain types of radar signals. When this undesired signal is present, it may be eliminated as shown by the circuit of Fig. 1, as well as the circuits of Figs. 6 through 11, by modulating the current of the reading beam by a 30 megacycle oscillator 26 which produces the desired output signal across resistance 35, but amplitude modulated on a 30 megacycle carrier. The 30 megacycle carrier is then applied to 30 megacycle tuned amplifier 37. The 30 megacycle carrier frequency is arbitrarily chosen and must meet the principal requirement of being high in comparison with the unwanted frequencies introduced by the current modulation of the writing beam, in order that the undesired frequencies will not be amplified by tuned amplifier 37. The desired reading beam frequencies are derived from the 30 megacycle amplifier 37 by detector 38, and then amplified by the direct current and video amplifier 39, the output of which appears on terminal 41.

In the event that the input signal applied to the writing beam is unmodulated, as would be the case in certain cathode ray tube applications, the 30 megacycle oscillator would be unnecessary as no consequent distinction need be made in the output voltage appearing across resistance 35. This is due to the fact that an unmodulated writing beam would produce only a steady direct current flow through the resistance 35, and hence, be only a bias component of the output signal.

As has been previously mentioned, collector electrode 13 is connected to output terminal 41 through feedback loop 45, so that the collector electrode's potential follows the output signal potential. By having the collector electrode 13 potential follow the output signal potential with the target potential remaining constant, the relatively high negatively charged portions of the target electrode tend to yield smaller output signals inasmuch as the collector electrode potential is brought close to the target electrode potential by the feedback action. In the same manner, the relatively low negatively charged portions of the target tend to yield larger output signals inasmuch as the target electrode is made more negative with respect to the collector electrode. Thus, the previously mentioned difficulties arising from operating the collector electrode at a fixed potential are eliminated.

The manner of operation of amplifier 39 constitutes an important factor in the operation of the feedback loop 45. In order for the "graphechon" tube to produce an output signal, it is necessary for the collector electrode to be maintained positive at all times with respect to the target electrode. Thus, the final output voltage from direct current and video amplifier 39 on terminal 41 must be a pulsating direct current potential, the pulsations constituting the output signal. The polarity of the direct current potential output from amplifier 39 must be positive with respect to ground, and must be of such steady state value as to maintain the collector electrode potential positive at all times with respect to the target electrode potential, regardless of the amplitude of output voltage pulsations. Amplifier 39 may be of any conventional type capable of meeting the above requirements.

As previously described in connection with Fig. 4, the linear operation of the tube is secured by maintaining the potential difference between the target and collector electrodes substantially within bracket 401 at all times. The output signal produced by operating within this bracket is substantially directly proportional to the potential difference between the collector and target electrodes, and to secure this operational condition, it is necessary that a phase reversal of the output signal from output terminal 41 to target electrode 14 take place. This phase reversal is necessary to secure the conventional and well-known degenerative or negative feedback. Without such a phase reversal, the feedback signal would be of the regenerative or positive variety, which would produce non-linear operation of the tube.

The main phase shift of the entire loop from the target electrode to the collector electrode must inherently come from the overall phase shift in the successive circuits comprising 30 megacycle amplifier 37, detector 38, and amplifier 39. The overall phase shift introduced by these networks must meet the conditions set forth above; namely, an inverse relationship of the potential difference between the target and collector electrodes, and the target output signal. As shown in feedback loop 45, the phase adjusting network 47, coupled between output terminal 41 and collector electrode 13, is utilized as a "fine adjustment" so that the final overall phase shift may be adjusted with precision.

The "graphechon" tube, with its collector electrode tied to the circuit output terminal by negative feedback loop 45, as shown in Fig. 1, will behave in a different manner than it would without the feedback connection. As the reading beam contacts an incremental condenser unit, it produces a signal therefrom which appears across resistor 42, with the result that the collector electrode potential is immediately reduced to a value only slightly more positive than the contacted condenser unit by the negative feedback loop. This action, as described for one condenser unit in connection with Fig. 5, recurs instantaneously in the same manner for all incremental condenser units upon their being contacted by the reading beam. Hence, the collector electrode potential is kept pulsating in exact accordance with the magnitude of the output signal. Under this condition of operation, the collector electrode potential is never more than only slightly positive with respect to each incremental condenser unit during its scanning period by the reading beam.

Under this new condition of operation, since the collector electrode potential is positive approximately the same small amount at all times with respect to the target electrode potential, the discharge time for all portions of the target, regardless of the individual charges thereon, is identical. Hence, no blank portions will appear in the output signal corresponding to the weakly charged portions of the target electrode. Likewise, the output signal from all portions of the target will be linear with respect to the individual charges thereon, and hence, the output signal will not contain partly linear and partly non-linear portions corresponding, respectively, to the lightly charged and the heavily charged portions of the target electrode.

In Fig. 4, this new point of operation of the collector electrode potential, with respect to the target electrode potential for average conditions, is indicated approximately by bracket 401. The greater the quantity of negative feedback, the smaller will be this bracket, and the greater the degree of linearity of the output signal. Hence, the linearity of the output signal is directly proportional to the amount of feedback. Also, the smaller the bracket, the less the output signal; hence, the magnitude of output signal is inversely proportional to the amount of feedback. This condition is similar to the effect produced by conventional negative feedback in vacuum tube circuits.

The storage time will be lengthened in proportion to the amount of negative feedback inasmuch as this amount of negative feedback determines to what degree the collector electrode potential is positive at all times with respect to the target surface. The degree to which the collector electrode is positive with respect to the target electrode surface in turn determines the amount of secondary emission electrons collected by the collector electrode, and it is this amount of collection that determines not only the magnitude of the output signal, but also the storage time.

In the description of the operation of "graphechon" tube circuits without feedback, it was noted that the portions of the target having a relatively high negative charge had different storage times than the portions having a relatively low negative charge. However, with feedback, all portions of the target pattern are discharged in the same length of time because the feedback loop operates to make the potential difference between the collector electrode and each element of the target electrode constant thus making the rate of discharge proportional to the remaining charge on each element.

The signal-to-noise ratio of the ouput signal becomes progressively worse as the potential difference between the collector electrode and the target electrode surface becomes smaller and smaller, due to the resultant decrease in the magnitude of the output signal. Therefore, the proportion of noise to the desired signal is directly proportional to the amount of the negative feedback. Inasmuch as storage time is desirable, and noise is undesirable, and since both are directly proportional to the amount of negative feedback, it is necessary to make some compromises in the final circuit. One possible compromise lies in the adjustment of the magnitude of the negative feedback by, for example, adjusting the amount of amplification of amplifier 39 to balance the storage time and noise to two arbitrary values, both of which are satisfactory for the intended circuit operation. Another solution is to adjust the magnitude of the reading beam current. An increase in reading beam current will cause faster discharge of the charged portions on the target electrode surface, and hence, will result in a shorter storage time. At the same time, such an increase will produce a greater output signal, thereby improving the signal-to-noise ratio. In this case, the desired results will be determined by the beam current which, in turn, will produce the proper relationship between storage time and noise.

Referring now to Fig. 6, there is herein illustrated a device employing the tube circuit of Fig. 1, wherein an output signal from one television receiving system, having a given sweep frequency and number of lines, is electronically transferred into a visual output appearing on another television system having a different sweep frequency and number of lines. It is to be expressly understood, however, that the other embodiments of the invention, as found in Figs. 8 through 13 and hereinafter described, may likewise be utilized in the circuit of Fig. 6, instead of the circuit of Fig. 1 with substantially the same results.

In Fig. 6, the double-ended target magnetic-deflection "graphechon" tube is the same type as described in Fig. 1. An input signal source, such as receiver 601, with antenna 600 has its output modulated signal applied by conductor 20 to electron gun 19 of writing gun 11, and its deflection voltages applied by conductors 16 and 17 to deflection coil 18. A kinescope 609, on whose screen 611 the televised signal appears, receives on its deflection coil 608 the identical deflection pattern signals as are applied to coil 25 of reading gun 12 of the "graphechon" tube. The deflection voltages are applied by conductors 606 and 607 to the deflection coil 608 from deflection voltage source 604. A single high voltage power supply 614 supplies a first high voltage to writing gun 11 through a conductor 51, a second high voltage to reading gun 12 through a conductor 52, and a third high voltage to the electron gun 610 of kinescope 609 through a conductor 615.

The output signal of the "graphechon" tube and associated circuit, appearing on terminal 41, is fed directly into electron gun 610 of kinescope 609 by conductor 612, and produces on the phosphorescent screen 611 an image corresponding to the output of television receiver 601, but having a sweep frequency and a number of lines as determined by deflection circuit 604.

Because of the feedback employed through loop 45, as explained in connection with the device of Fig. 1, the "graphechon" tube will produce an output signal on terminal 41 which is linear with respect to the input signal. Hence, the pattern appearing on screen 611 will have a contrast corresponding to that of the output signal of television receiving system 601, and will thus be a faithful reproduction thereof. In this case, it is probable that the storage time desired will be quite small due to the relatively large number of frames or complete scans per unit time made by the writing beam. Also, no new images should be placed on target electrode 14 until the previous charge has been partially removed by the reading beam in order to secure an accurate reproduction. As explained previously, the storage time can be reduced either by reducing the amount of negative feedback or by increasing the amount of reading beam current, or both. Thus, the storage time desired, which is determined by the number of scans made by the writing gun per unit time, can be adjusted to the correct value by a proper manipulation of these two variables. This storage time, in practice, may be made as small as one-thirtieth of a second.

Referring now to Fig. 7 there is herein illustrated a device similar to the device of Fig. 1, except that a single-ended target magnetic deflection "graphechon" tube is utilized. The essential difference between the single-ended and double-ended target "graphechon" tubes, as shown in Figs. 7 and 1, respectively, lies in the fact that the reading and writing guns both face the dielectric layer on the target in the single-ended target type. Target electrode 702 is composed of a conductive metal plate 703 which is of sufficient thickness and strength to insure structural stability. On plate 703, there is deposited a thin layer of dielectric material 704, which is similar to dielectric layer 31 in Fig. 1. Plate 703 is connected to the tube output terminal 706 by conductor 705. The output signal of the target electrode appears on terminal 706 and is applied to the input terminal of 30 megacycle amplifier 37 by conductor 36. Collector electrode 701 is a metallic coating on the inside of the tube as was the case for the tube of Fig. 1. The remaining circuitry illustrated in Fig. 8 is identical to that shown in Fig. 1.

The operation of the "graphechon" tube and circuit disclosed in Fig. 7 is identical in all respects to the operation described in conjunction with Fig. 1, except that the writing beam in Fig. 7 need not penetrate plate 703 although emergence from dielectric film 704 is necessary. Since the results obtained by the use of the negative feedback loop 45 in Fig. 7 are identical to the results obtained in Fig. 1, the detailed description of Fig. 1 is applicable to Fig. 7.

Referring now to Fig. 8 there is disclosed a "graphechon" tube and associated circuitry similar to that found in Fig. 7, except that a single-ended target electrostatic deflection type of "graphechon" tube is utilized. This "graphechon" tube contains a writing gun 802, consisting of deflection plates 810, 811 and 812, which in turn are connected to input signal source 805 by conductors 806, 807 and 808, respectively. Electron gun 19, of writing gun 802, is connected by conductor 20 to input signal source 805 to receive the writing beam modulation signal therefrom.

A deflecting plate (not shown) parallel to and spaced apart from plate 810, is connected through conductor 809 to input signal source 805. Shield 813, between the target 702, and the reading and writing gun, is connected to ground by conductor 814.

The reading gun 803 includes deflection plates 821, 822 and 823 which are connected to deflection circuit 816 by conductors 817 and 818, 819, respectively. In addition, a deflection plate (not shown) parallel to and spaced apart from plate 821, is connected through conductor 820 to deflection circuit 816. Electron gun 28 of reading gun 803 is connected to 30 megacycle oscillator 26 by conductor 27.

Electron gun 19 of writing gun 802 receives a high potential signal from high voltage supply 50 through conductor 51, and electron gun 28 of reading gun 803 receives a high potential signal from high voltage supply 50 through conductor 52.

Target 702 of the "graphechon" tube shown in Fig. 8 is identical to the target of the single-ended target magnetic deflection "graphechon" tube shown in Fig. 7. The only difference between the embodiment shown in Fig. 7 and that shown in Fig. 8, lies in the type of deflection provided within the tube envelope, the latter being of the electrostatic variety.

No operational difference occurs from using different types of deflection means, in Figs. 7 and 8, and the operation of the "graphechon" tube and its associated circuit, shown in Fig. 8, is identical to that described for Fig. 7.

Likewise, other feedback loops, to be described in conjunction with the circuit diagrams of Figs. 9 through 13, are equally adaptable to the "graphechon" tubes of the types shown in Figs. 7 and 8.

Figure 9:
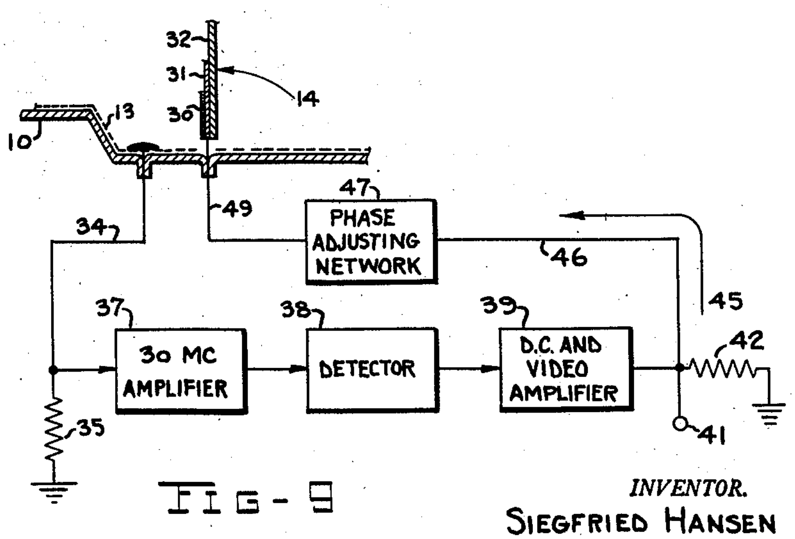

Referring now to Fig. 9, there is illustrated the identical feedback loop 45 as illustrated previously in Fig. 1, but connected differently within the "graphechon" tube circuit. In this embodiment, collector electrode 13 is connected to ground through resistor 35. The signal appearing across this resistor is fed into 30 megacycle amplifier 37, the output signal of which is fed into detector 38. The output signal of detector 38 is fed into direct current and video amplifier 39, which in turn produces the output signal of the "graphechon" tube circuit at terminal 41. Feedback loop 45 is connected from output terminal 41 to target 14.

As previously mentioned in connection with the device of Fig. 1, the removal of secondary emission electrons from the target electrode of a "graphechon" tube produces a signal thereon. These same secondary emission electrons, upon collection by the collector electrode and their subsequent conduction to ground, produce a current flow of an identical magnitude, but of opposite phase to the current flow from target electrode 14 to ground. It will be noted that an external conducting path exists between the collector electrode and the target electrode by way of ground for an external current flow corresponding to the secondary emission electron flow within the tube envelope.

In the device of Fig. 9, the secondary emission electron collection by the collector electrode produces the output signal, and the target electrode potential is made to pulsate in accordance with the output signal in the same manner as was done for the collector electrode potential in the device of Fig. 1. No basic changes in the mode of operation are brought about in this embodiment, as compared to the device of Fig. 1, owing to the fact that the current flow to the target electrode from ground is identical to the current flow from the collector electrode to ground.

In Fig. 1, the collector electrode potential was held slightly positive at all times with respect to the target surface potential by the feedback voltage. In Fig. 9, however, the feedback signal must keep the target potential slightly negative at all times with respect to the collector electrode. The basic amount that the target potential is negative, with respect to the collector electrode potential, is determined by the steady state operating condition of amplifier 39, and its deviation from this basic amount is introduced by the feedback signal applied to the target electrode in the manner described for the device of Fig. 1.

The 30 megacycle signal from oscillator 26 modulates the reading beam to distinguish the desired output signal component from a writing beam modulation component, both appearing in the tube output signal. The writing beam component is produced by the aluminum plate 31 emitting secondary emission electrons upon being struck by the writing beam, the number of secondary emission electrons being proportional to the instantaneous value of the writing beam current. These secondary emission electrons are thus modulated in accordance with the writing beam modulation, and upon being collected by the collector, appear as a desired signal component of the tube output signal.

Figure 10:
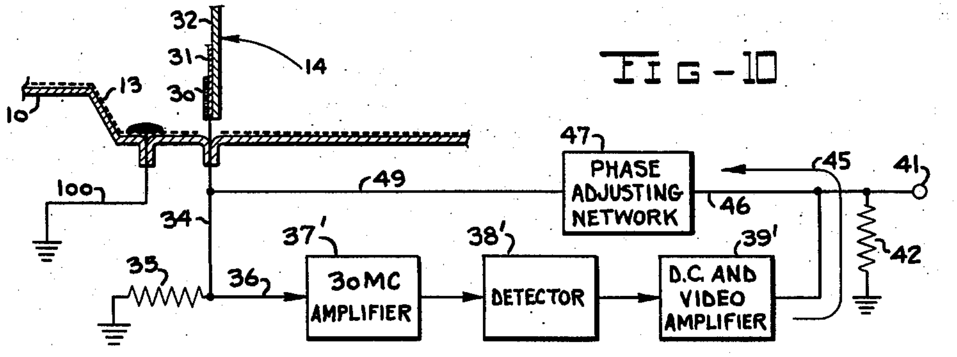
Figure 11:
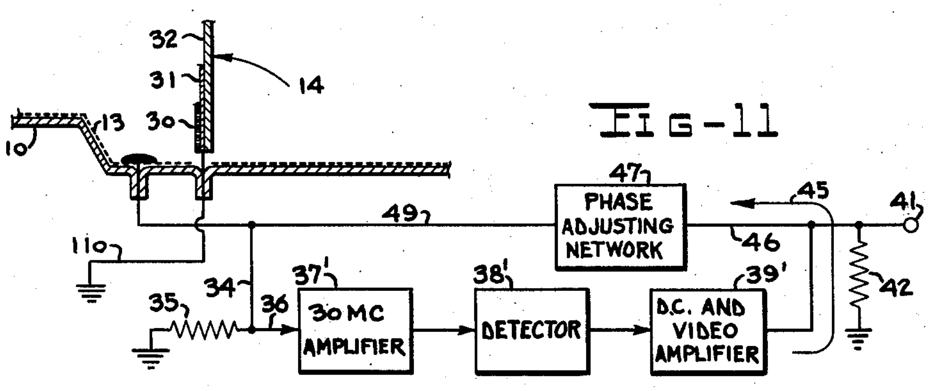

Referring now to Figs. 10 and 11, there are here illustrated two additional embodiments of the present invention, each of which provides for the linear operation of a storage tube in a manner similar to the devices of Figs. 1 and 9. The distinguishing characteristic of these embodiments is that the feedback signal is applied directly to the "graphechon" tube element from which the original tube output signal was taken.

In Fig. 10, collector electrode 13 is connected to ground by conductor 100. The tube output signal from target 14 appears across resistor 35, and is sequentially amplified by 30 megacycle amplifier 37′, detected by detector 38′, and the detected signal amplified by amplifier 39′, to appear as a circuit output signal on terminal 41. The feedback loop 45, identical to the feedback loop 45 of Figs. 1 and 9, is connected from output terminal 41 to target electrode 30.

The tube output signal appearing across resistor 35 is of different form than that fed back thereto by feedback loop 45. This tube output signal is an amplitude modulated carrier of 30 megacycles, whereas the feedback signal fed from the output terminal 41 to the target by feedback loop 45 corresponds to the envelope of the 30 megacycle wave.

This feedback signal, when applied to the target electrode by loop 45, acts to modify the target electrode potential in accordance with the circuit output signal appearing on terminal 41. Since the collector electrode voltage is held constant, the target voltage is varied in accordance with the charge pattern initially placed on the target.

In operation, when the reading beam strikes a highly negatively charged portion of the target, the output signal tends to increase in magnitude, and this increase must be fed back by the feedback loop 45 in such a manner as to bring the instantaneous target potential closer to the collector potential to reduce this increase of magnitude. Similarly, when the reading beam scans a slightly negatively charged portion of the target electrode, the output signal magnitude tends to decrease, and this decrease must be fed back to the target electrode in such a manner as to increase the potential difference between the target and collector electrodes and thereby increase the output signal magnitude.

To accomplish the foregoing results, the phasing introduced in the device of Fig. 10 by the serially connected 30 megacycle amplifier 37′, detector 38′, and direct current and video amplifier 39′, must differ by 180° from the phase angle introduced by the corresponding circuits in the devices of Figs. 1 and 9. This difference in phasing is necessary because of the different points of connection of the feedback loop 45. The phase adjusting network 47 in feedback loop 45 is utilized for the same purpose as previously described, i.e., a "fine adjustment" of the phase of the feedback signal.

The device of Fig. 11 is similar in structure and operation to the device of Fig. 10, except that, in this embodiment, the tube output signal is taken from the collector electrode, while the target electrode is connected to ground by conductor 110. The circuit output signal, appearing on terminal 41, is fed by feedback loop 45 to collector electrode 13. The phase relationship between the tube output signal, appearing across resistor 35, and the circuit output signal appearing on terminal 41, must be the same as described above for the device of Fig. 10 in order to obtain the desired results by the feedback loop.

Figure 12:
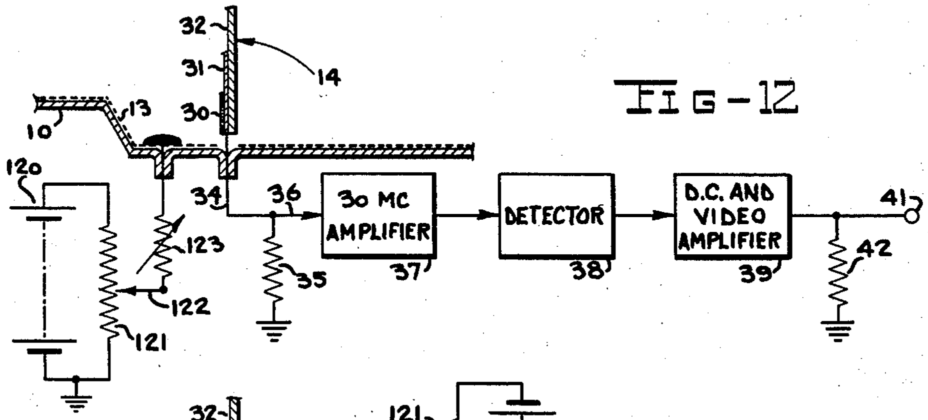

Referring now to Fig. 12, there is illustrated another embodiment of the present invention wherein a degenerative feedback circuit is employed which will accomplish approximately the same result as feedback loop 45, but in a different manner. A source of potential, such as battery 120, has its negative terminal connected to ground, and a potentiometer 121 is connected across battery 120. The movable arm 122 of potentiometer 121 is connected to collector electrode 13 through variable resistor 123. The resistance of potentiometer 121 should be small in comparison to the normal working resistance of variable resistor 123.

The operation of this circuit depends on the signal produced across resistor 123 by the ground return of the secondary emission electrons collected by the collector electrode. The potentiometer 121 is adjusted to impart a positive potential to the collector electrode, so that a portion of the secondary emission electrons is drawn thereto upon its liberation from the target surface. These secondary emission electrons, upon flowing through resistor 123, produce a potential drop thereacross which opposes the positive potential of the battery, thereby dropping the net positive potential of the collector electrode. The greater the number of secondary emission electrons collected by the collector electrode, as is the case for highly charged portions of the target surface, the less positive the collector electrode becomes with respect to the target electrode surface, thus tending to limit the collection of the secondary emission electrons. Conversely, for the less negatively charged portions of the target, the collector electrode potential approaches the battery potential and thereby collects a greater percentage of the available secondary electrons. The effect of this degenerative feedback circuit is to cause the collector electrode potential to pulsate in accordance with the instantaneous number of secondary electrons collected by it, which, in turn, is determined by the charge pattern on the target electrode surface.

The magnitude of this degenerative feedback potential is determined by the resistance of variable resistor 123. A relatively low value of resistance maintains the collector electrode potential reasonably close to the battery potential and thus limits the feedback action. On the other hand, a relatively high resistance value of resistor 123 causes the collector electrode potential to deviate further from battery potential and approach the target potential in value for the highly charged portions thereof, thus giving greater feedback action. In some instances, it might be desirable to include a phasing network in this feedback circuit to compensate for impedances within the storage tube.

Figure 13:
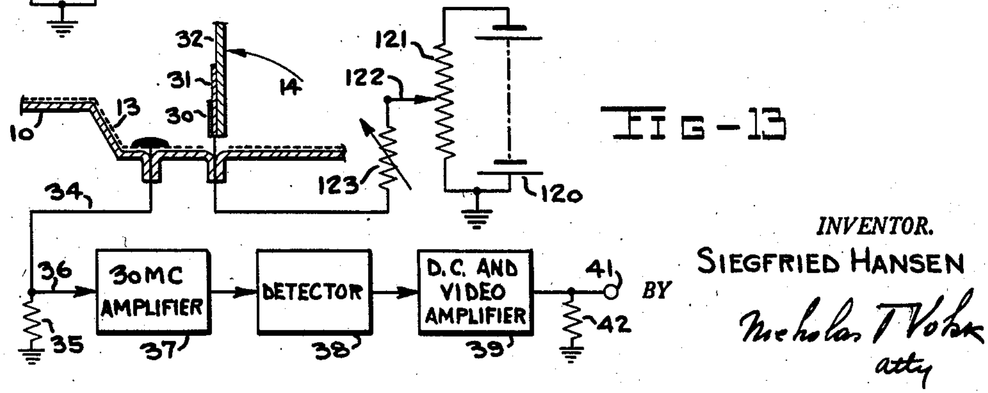

Referring now to Fig. 13, there is herein illustrated a degenerative feedback circuit of the type shown in Fig. 12 connected between the target electrode and ground, with the output signal being obtained from collector electrode 13. In this embodiment, the polarity of battery 120 is reversed so as to impress a constant negative potential on the target through variable resistor 123. The electron flow to the target electrode through resistor 123 is of such direction as to make the magnitude of the potential difference between the target and collector electrodes inversely proportional to the magnitude of the output signal. Thus, an output signal of a relatively low magnitude causes a greater potential difference between the collector and target electrodes which, in turn, tends to increase its magnitude. On the other hand, an output signal of a relatively large magnitude, will reduce potential difference between the target and collector electrodes which, in turn, will decrease the magnitude of the output signal.

The various feedback circuits of the present invention are illustrated as applied to "graphechon" tube circuits. They are also applicable in a similar manner to the general class of storage tubes of which the "graphechon" tube is the most widely known example. The feedback circuits, as shown and described in combination with the collector electrode and the target electrode of a "graphechon" tube will, likewise, produce similar results when applied in a similar manner to corresponding electrodes of the other storage tubes of this class.

What is claimed is:

1. A circuit for providing linear operation of a storage tube having collector and target electrodes, said circuit comprising: an external conductive circuit between said electrodes including the series combination of an impedance element for producing an output signal from the storage tube and a conduction path; and feedback means connected to respond to the current flow in one of said electrodes for producing a voltage across at least a portion of said external conductive circuit to continuously maintain the instantaneous potential difference between the electrodes substantially constant to provide for linear operation of said tube.

2. A circuit for providing linear operation of a storage tube having collector and target electrodes, said circuit comprising: a resistor connected between one of said electrodes and ground for producing an output signal from the storage tube; a conduction path between the other of said electrodes and ground, said resistor and said conduction path forming an external conductive circuit between said electrodes; and feedback means connected to respond to the current flowing between an electrode and ground for producing a voltage across a portion of said external conductive circuit having a polarity and amplitude so related to the output signal produced across said resistor as to maintain a substantially constant potential differential between said collector and target electrodes.

3. A circuit for providing linear operation of a storage tube having target and collector electrodes, said circuit comprising: a signal path between one of said electrodes and ground; a direct current amplifier having input and output circuits, the input circuit of said amplifier being coupled to said signal path; and feedback means, connected from the output circuit of said direct current amplifier to one of said electrodes, for continuously maintaining a constant instantaneous potential difference between the collector and target electrodes to provide for linear operation of said storage tube.

4. A storage tube circuit as defined in claim 3, in which said signal path is connected between said collector electrode and ground, and said feedback means is connected between the output circuit of said direct current amplifier and said collector electrode.

5. A storage tube circuit as defined in claim 3, in which said signal path is connected between said target electrode and ground, and said feedback means is connected between the output circuit of said direct current amplifier and said target electrode.

6. A storage tube circuit as defined in claim 3, in which said signal path is connected between said collector electrode and ground, and said feedback means is connected between the output circuit of said direct current amplifier and said target electrode.

7. A storage tube circuit as defined in claim 3, in which said signal path is connected between said target electrode and ground, and said feedback means is connected between the output circuit of said direct current amplifier and said collector electrode.

8. A linearly operating storage tube circuit for a storage tube having collector and target electrodes, said circuit comprising: a first signal path connected between one of said electrodes and ground; a second signal path connected between the other of said electrodes and ground; a direct current amplifier having input and output circuits, and means connecting the input circuit of said direct current amplifier to one of said signal paths, said first signal path including feedback means connected between the output circuit of said direct current amplifier and said one electrode for continuously maintaining the collector electrode positive by a substantially constant amount with respect to said target electrode to provide for a linear operation of said tube.

9. A linearly operating storage tube circuit comprising: a storage tube having target and collector electrodes, said target electrode emitting secondary emission electrons; a source of potential; and means coupling said source between said electrodes to attract a portion of said emitted secondary emission electrons to said collector electrode, said means including an impedance connected between one of said electrodes and said source, the conduction of said secondary emission electrons through said impedance producing a voltage drop thereacross opposite in polarity to the potential of said source for maintaining the instantaneous net collector electrode potential continuously positive with respect to said target potential by substantially the same amount to provide for a linear operation of said tube.

10. A storage tube circuit as defined in claim 9, in which said impedance is connected between said collector electrode and said source of potential.

11. A storage tube circuit as defined in claim 9 in which said impedance is connected between said target electrode and said source of potential.

12. A transfer system for linearly converting an electrical input signal of a predetermined pattern representing a visual image into an output signal of a different pattern but representing the same visual image, said system comprising: a storage tube having collector and target electrodes; means for storing the input on said target electrode; an external signal path, including feedback means conductively coupled between said electrodes, the output signal of the tube appearing across a portion of said path; and potential means connected to said signal path, said feedback means being connected between said potential means and one of said electrodes for continuously maintaining the instantaneous potential difference between said collector and target electrodes substantially constant whereby the amplitude of the output signal is proportional to the amplitude of the input signal.

13. A circuit for providing linear operation of a storage tube having collector and target electrodes, said circuit comprising: an external current return path conductively coupled between the target and collector electrodes; an output circuit coupled in said path for producing an output signal from the storage tube; and feedback means for maintaining a constant potential difference between the target and collector electrodes to provide for linear operation of the storage tube, said feedback means constituting a portion of said external current return path.

14. A circuit for providing linear operation of a storage tube having target and collector electrodes, said circuit comprising: a resistor connected between one of said electrodes and ground for producing an output signal from the storage tube; a conduction path between the other of said electrodes and ground, said resistor and said conduction path forming an external conductive circuit between said electrodes; and feedback means responsive to the current flowing between an electrode and ground in said external conductive path for producing a voltage between one of said electrodes and ground corresponding to the voltage appearing between the other of said electrodes and ground whereby a substantially constant potential differential is maintained between said electrodes, said feedback means including an element constituting a portion of said external conductive circuit.

15. A circuit for providing linear operation of a storage tube having target and collector electrodes, said circuit comprising: an external conductive circuit connected between said electrodes, said conductive circuit including at least one resistor and embracing ground potential; and feedback means responsive to the current flowing in said external conductive circuit between one of said electrodes and ground for maintaining the potential of said collector electrode at a potential with respect to ground more positive by a constant amount than the potential of the target electrode with respect to ground, said feedback means including said one resistor.

References Cited in the file of this patent

UNITED STATES PATENTS 2,687,492 Szegho et al. ---------- Aug. 24, 1954